United States Patent [19]

Dumoulin et al.

[11] Patent Number: 4,544,684
[45] Date of Patent: Oct. 1, 1985

[54] COMPOSITIONS BASED ON VINYLIDENE FLUORIDE POLYMERS INCORPORATING BORON CARBIDE

[75] Inventors: Joseph Dumoulin, Wezembeek-Oppem; Jean-Marie De Berraly, Waterloo, both of Belgium

[73] Assignee: Solvay & Cie S.A., Brussels, Belgium

[21] Appl. No.: 663,186

[22] Filed: Oct. 22, 1984

[30] Foreign Application Priority Data

Oct. 28, 1983 [FR] France .................. 83 17442

[51] Int. Cl.$^4$ .......................... G21F 1/10; C08K 9/00; C08K 3/38
[52] U.S. Cl. ................................. 523/136; 523/205; 524/404; 524/520
[58] Field of Search ................ 523/205, 136; 524/404, 524/520

[56] References Cited

U.S. PATENT DOCUMENTS

| | | | |
|---|---|---|---|
| 2,796,411 | 6/1957 | Zirkle et al. | 524/404 |
| 2,971,908 | 2/1961 | Chaffin | 524/404 |
| 3,261,800 | 7/1966 | Collins | 524/404 |
| 4,026,863 | 5/1977 | Iseki et al. | 523/205 |
| 4,176,093 | 11/1979 | Zoch | 524/404 |
| 4,194,040 | 3/1980 | Breton et al. | 524/404 |
| 4,251,432 | 2/1981 | Martin | 523/205 |

FOREIGN PATENT DOCUMENTS

| | | |
|---|---|---|
| 0021500 | 7/1981 | European Pat. Off. . |
| 2455067 | 11/1980 | France . |
| 56-122848 | 9/1981 | Japan .................. 524/404 |

*Primary Examiner*—Joseph L. Schofer
*Assistant Examiner*—N. Sarofim
*Attorney, Agent, or Firm*—Spencer & Frank

[57] ABSTRACT

Compositions based on vinylidene fluoride polymers incorporating boron carbide coated with an acrylic polymer, preferably with the use of an anchor coating consisting of a complex of a polyhydroxylated polymer and a transition metal cation.

The compositions are especially suitable for the manufacture of shaped articles intended to be employed in the nuclear field for neutron thermalization. No figure.

10 Claims, No Drawings

COMPOSITIONS BASED ON VINYLIDENE FLUORIDE POLYMERS INCORPORATING BORON CARBIDE

The present invention relates to compositions based on vinylidene fluoride polymers incorporating boron carbide.

Boron carbide is a powerful neutron-thermalising agent. Furthermore, vinylidene fluoride polymers offer a combination of useful properties and, particularly, high chemical inertness and heat stability, and good resistance to ionising radiations, which indicates that they are polymers capable of being employed for the manufacture of compositions incorporating boron carbide and capable of being fabricated by thermal and mechanical processing into shaped articles intended for moderating neutrons.

Nevertheless, it has now been found that compositions based on vinylidene fluoride polymers incorporating boron carbide undergo significant thermal degradation when they are employed at the usual temperatures for converting vinylidene fluoride polymers.

The present invention is consequently aimed at offering compositions which do not have this disadvantage.

According to the invention, these compositions incorporate boron carbide coated with an acrylic polymer. Acrylic polymer is intended to refer to polymers of alkyl acrylates or methacrylates whose alkyl groups contain from 1 to 6 carbon atoms. Acrylic polymers which may be employed for coating boron carbide include, therefore, both homopolymers of alkyl acrylates and methacrylates and copolymers containing at least 50% by weight and, preferably, at least 60% by weight of alkyl acrylates or methacrylates. As examples of comonomers which may be employed, mention can be made of alkyl acrylates and methacrylates whose alkyl groups contain from 1 to 6 carbon atoms, acrylamide, methacrylamide, acrylonitrile, methacrylonitrile and styrene. Preference is given to polymers of alkyl methacrylates and more particularly of methyl methacrylate. Preferred acrylic polymers for coating boron carbide are therefore chosen from polymethyl methacrylate and methyl methacrylate copolymers containing at least 60% by weight of methyl methacrylate. Among the latter, preference is given to copolymers of methyl methacrylate and a comonomer chosen from butyl acrylate and styrene and especially to copolymers of methyl methacrylate and styrene.

According to a preferred embodiment of the invention, the coating acrylic polymer also incorporates monomer units derived from a crosslinking monomer. As an example of such a crosslinking comonomer, mention can be made of ethylene glycol dimethacrylate. The quantity of crosslinking monomer present in the acrylic polymer is generally approximately 0.1 to 15% by weight and, preferably, approximately 1 to 10% by weight.

Consequently, coating acrylic polymers which are especially preferred are copolymers of methyl methacrylate, styrene or butyl acrylate and ethylene glycol dimethacrylate.

The method employed for coating boron carbide is not critical. Known methods of coating mineral substrates with polymers can therefore be utilised. Thus, coating may be carried out by polymerisation, in an aqueous dispersion of finely divided boron carbide, of the constituent monomers of the coating polymer with the aid of an initiator and, if appropriate, a polymerisation accelerator. Preferably, boron carbide particles are coated with an acrylic polymer with the use of an anchor coating which is fixed beforehand on the boron carbide particles.

According to a particularly preferred embodiment of the present invention, boron carbide is coated with an acrylic polymer with the use of an anchor coating consisting of a complex of a polyhydroxylated polymer and a transition metal cation. Such a coating method is described in Pat. No. EP-0,021,500 (WYNS-BRISTOL S.A. PEINTURES and N.V. TRIMETAL PAINT Co.).

The anchor coating consists, preferably, of a complex of polyvinyl alcohol and copper in the divalent cation state. Polyvinyl alcohol (PVAL) is intended to refer to partially hydrolysed polyvinyl acetates having a molar degree of hydrolysis of approximately 72 to 99.5% by weight and a molecular weight of approximately 13,000 to 132,000. The PVAL/$Cu^{++}$ complexes (approximate weight ratio 10/1), which are formed in situ or ex situ at a pH of at least 7, are placed in contact with the boron carbide particles dispersed in water. Although the particle size distribution of the boron carbide is not particularly critical, the latter is preferably employed in the form of a fine powder with an average particle size below 50 microns, and, preferably, below 10 microns. The anchor coating acts as a supported catalyst capable of taking part in the subsequent initiation of polymerisation of the monomers forming the coating layer to an acrylic polymer. The polymerisation is carried out by reacting, at a suitable temperature, in the aqueous dispersion of boron carbide particles provided with an anchor coating, the monomers forming the polymeric coating layer in the presence of a radical initiator which, advantageously, may be a carbon tetrahalide such as, for example, carbon tetrabromide. In some cases, the initiator may be activated, for example with triethanolamine.

The quantity of anchor agent (complex) and coating agent (acrylic polymer) may vary quite widely and depends, particularly, on the particle size distribution and consequently on the specific area of the boron carbide particles. It will be advantageously evaluated experimentally in each particular case. It is essential to ensure that the boron carbide particles have a homogeneous polymer coating in order to prevent any subsequent contact between the vinylidene fluoride polymer and boron carbide. Generally, the coating acrylic polymer is present at a concentration of approximately 0.1 to 50 parts and more particularly approximately 1 to 20 parts by weight per 100 parts of boron carbide and at a concentration of approximately 10 to 150 parts and more particularly approximately 20 to 100 parts by weight per 1 part of the anchor coating (complex).

The quantity of boron carbide coated with acrylic polymer which is present in the compositions based on vinylidene fluoride polymers according to the invention may vary very extensively, for example from 1 to 99% by weight. Usually, coated boron carbide is present at a concentration of approximately 5 to 75% by weight of the composition and still more particularly approximately 15 to 40% by weight.

Vinylidene fluoride polymers are intended to refer to all the polymers containing at least 85 mole % and, preferably, at least 90 mole % of monomer units derived from vinylidene fluoride. Vinylidene fluoride polymers which are suitable for producing compositions according to the invention consequently include both homopolymers of vinylidene fluoride and its copolymers containing monomer units derived from 1 or more comonomers. Preference is given to vinylidene fluoride polymers containing at least 90 mole % of monomer units derived from vinylidene fluoride, the appropriate remainder consisting preferably of monomer units derived from other fluorinated olefines, such as vinyl fluoride, trifluoroethylene, chlorotrifluoroethylene, tetrafluoroethylene and hexafluoropropylene.

Preparation of compositions according to the invention does not present any particular problem, all the usual methods for preparing these compositions being capable of being employed. A particularly advantageous operating procedure consists in adding coated boron carbide to the vinylidene fluoride polymer in powdered form during the production of a premix, at the same time as the other additives introduced into the composition. The boron carbide derivative may also be added directly in the equipment in which the vinylidene fluoride polymer is melted, such as screw extruders.

The compositions according to the invention are capable of being utilised by means of all conventional methods for fabrication of thermoplastic materials. They are especially suitable for fabrication of shaped articles such as plates, rings, and the like, intended for use in the nuclear field for neutron thermalisation (moderation).

The following examples illustrate the invention, albeit without restricting it.

In Examples 1 and 2, the polymer is a vinylidene fluoride copolymer containing 10% by weight of monomer units derived from a fluorinated olefine, of trade name SOLEF and type 11010, produced and marketed by SOLVAY & Cie.

In Examples 3 and 4, the polymer is a vinylidene fluoride homopolymer of trade name SOLEF and type 1010, produced and marketed by SOLVAY & Cie.

Examples 1 and 3 illustrate compositions according to the invention incorporating boron carbide coated with an acrylic polymer. In Example 1 the coating polymer is a copolymer of methyl methacrylate, styrene and ethylene glycol dimethacrylate (approximate weight composition 71:24:5). In Example 3 the coating polymer is a copolymer of methyl methacrylate, butyl acrylate and ethylene glycol dimethacrylate (approximate weight composition 76:19:5).

Examples 2 and 4, for reference, illustrate compositions incorporating uncoated boron carbide.

Compositions according to Examples 1 to 4 all contain 4 parts by weight of vinylidene fluoride polymer per 1 part by weight of boron carbide.

EXAMPLE 1

Coating of the boron carbide

Into a 1 l glass reactor equipped with a propeller stirrer are introduced, with vigorous stirring (145 rev/min) and at ambient temperature, 400 g of boron carbide as particles having a mean diameter of approximately 1 micron, 200 ml of an aqueous solution of emulsifier (sodium salt of a fatty acid), 40 ml of demineralised water, 40 ml of a 0.1N aqueous solution of sodium hydroxide and 10 drops of antifoam. The temperature of the aqueous dispersion is raised to 60° C. and stirring is continued for 15 minutes. 25 ml of an aqueous solution containing 2% of polyvinyl alcohol and 0.2% of $Cu^{++}$ ions, prepared beforehand by dissolving polyvinyl alcohol, POLYVIOL 04/20, marketed by WACKER, and copper nitrate, are then added slowly (over 25 minutes). Stirring is continued for 30 minutes. During this time, air present in the reactor is removed by successive evacuations and introduction of nitrogen. There are then added, still with stirring and at 60° C., 10 g of methyl methacrylate, 2 g of ethylene glycol dimethacrylate and 0.05 g of carbon tetrabromide. After 15 minutes, 20 g of methyl methacrylate, 10 g of styrene and 0.15 g of carbon tetrabromide are injected. Polymerisation is continued for 4 hours at 60° C. (degree of conversion >90%), after which the coated boron carbide is isolated by filtration under pressure, washing with water, filtering and drying in a ventilated oven for 15 hours at 110° C. Agglomerates which may be present are disintegrated by grinding in a ball mill.

Preparation and evaluation of the composition 400 g of vinylidene fluoride polymer are mixed with 100 g of coated boron carbide in a slow mixer, after which the granules are extruded in a double-screw extruder maintained at 190° C.

1.2 g of granules are placed in a silver oven through which a stream of air is maintained. At the exit of the oven, air and hydrofluoric acid are absorbed in an aqueous solution of citric acid monohydrate at a concentration of 8.02 g/l and of $Na_2HPO_4.2H_2O$ at a concentration of 22.48 g/l in dimineralised water (pH=6) and the quantity of hydrofluoric acid released by heating in air after various periods of time is determined.

The investigation of the kinetics of dehydrofluorination at 220° and 250° C. are shown in Table I, which is appended.

EXAMPLE 2

This example, given by way of reference, relates to an identical composition to that of Example 1 except that the boron carbide is not coated.

EXAMPLE 3

In this example, the boron carbide is coated by following the operating procedure of Example 1, except that at the beginning of the polymerisation at 60° C. there are introduced 8 g of methyl methacrylate, 2 g of butyl acrylate, 2 g of diethylene glycol dimethacrylate and 0.05 g of carbon tetrabromide, and, 15 minutes later, 24 g of methyl methacrylate, 6 g of butyl acrylate and 0.15 g of carbon tetrabromide.

EXAMPLE 4

This example, given for reference, relates to a composition identical to that of Example 3, except that the boron carbide is not coated.

The kinetics of dehydrofluorination of the compositions according to Examples 2, 3 and 4 are evaluated under the conditions described in Example 1. The results are also shown in Table 1, which is appended.

TABLE I

| Example No. | Test temperature, °C. | Test period, min. | Quantity of hydrofluoric acid released, mg/kg of composition |
|---|---|---|---|
| 1 | 220 | 12 | 32 |
|  | " | 30 | 92 |
|  | " | 60 | 145 |
| 1 | 250 | 12 | 36 |
|  | " | 30 | 130 |
|  | " | 60 | 240 |
| 2R | 220 | 12 | $5.10^3$ |

TABLE I-continued

| Example No. | Test temperature, °C. | Test period, min. | Quantity of hydrofluoric acid released, mg/kg of composition |
|---|---|---|---|
| | " | 30 | $17.10^3$ |
| | " | 60 | $28.10^3$ |
| 2R | 250 | 12 | $16.10^3$ |
| | " | 30 | $36.10^3$ |
| | " | 60 | $51.10^3$ |
| 3 | 220 | 30 | 10 |
| | " | 60 | 20 |
| | " | 120 | 25 |
| 3 | 250 | 30 | 0 |
| | " | 60 | 280 |
| | " | 120 | 720 |
| 4R | 220 | 30 | $9.10^3$ |
| | " | 60 | $26.10^3$ |
| | " | 120 | $52.10^3$ |
| 4R | 250 | 30 | $49.10^3$ |
| | " | 60 | $69.10^3$ |
| | " | 120 | $95.10^3$ |

We claim:

1. Compositions based on vinylidene fluoride polymers incorporating boron carbide, characterised in that the boron carbide is coated with an acrylic polymer.

2. Compositions according to claim 1, characterised in that the acrylic polymer is chosen from polymethyl methacrylate and copolymers of methyl methacrylate containing at least 60% by weight of methyl methacrylate.

3. Compositions according to claim 2, characterised in that the acrylic polymer is a copolymer of methyl methacrylate and a comonomer chosen from styrene and butyl acrylate.

4. Compositions according to claim 1, characterised in that the acrylic polymer contains from 1 to 10% by weight of a crosslinking comonomer.

5. Compositions according to claim 1, characterised in that the acrylic polymer is chosen from copolymers of methyl methacrylate, styrene or butyl acrylate and ethylene glycol dimethacrylate.

6. Compositions according to claim 1, characterised in that the boron carbide is coated with an acrylic polymer with the use of an anchor coating consisting of a complex of a polyhydroxylated polymer and a transition metal cation.

7. Compositions according to claim 6, characterised in that the anchor coating consists of a complex of polyvinyl alcohol and copper in the divalent cation state.

8. Compositions according to claim 1, characterised in that the coating acrylic polymer is present at a concentration of approximately 0.1 to 50 parts by weight per 100 parts of boron carbide and at a concentration of approximately 10 to 150 parts by weight per 1 part of the anchor coating.

9. Compositions according to claim 1, characterised in that the boron carbide is present at a concentration of approximately 5 to 75% by weight of the composition.

10. Compositions according to claim 9, characterised in that the boron carbide is present at a concentration of approximately 15 to 40% by weight of the composition.

* * * * *